(12) United States Patent
Lee et al.

(10) Patent No.: US 11,429,612 B2
(45) Date of Patent: Aug. 30, 2022

(54) ADDRESS SEARCH CIRCUIT AND METHOD OF SEMICONDUCTOR MEMORY APPARATUS AND CONTROLLER THEREFOR

(71) Applicant: SK hynix Inc., Gyeonggi-do (KR)

(72) Inventors: Joung Young Lee, Gyeonggi-do (KR); Dong Sop Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 166 days.

(21) Appl. No.: 16/841,089

(22) Filed: Apr. 6, 2020

(65) Prior Publication Data

US 2021/0064622 A1 Mar. 4, 2021

(30) Foreign Application Priority Data

Sep. 4, 2019 (KR) .......................... 10-2019-0109446

(51) Int. Cl.
*G06F 16/24* (2019.01)
*G06F 16/2455* (2019.01)
*G06F 12/1009* (2016.01)

(52) U.S. Cl.
CPC .... *G06F 16/24552* (2019.01); *G06F 12/1009* (2013.01); *G06F 2212/657* (2013.01)

(58) Field of Classification Search
CPC ........... G06F 16/24552; G06F 12/1009; G06F 2212/657

USPC .......................................................... 711/203
See application file for complete search history.

(56) References Cited

U.S. PATENT DOCUMENTS 9,244,858 B1 * 1/2016 Hu ...................... G06F 12/1072
2018/0067650 A1 * 3/2018 Hayakawa .......... G06F 12/0638

FOREIGN PATENT DOCUMENTS

KR 10-0880425 1/2009

* cited by examiner

*Primary Examiner* — Hua J Song
(74) *Attorney, Agent, or Firm* — IP & T Group LLP

(57) ABSTRACT

An address search circuit of a semiconductor memory apparatus may include a first search interface configured to receive a search command, generate a first signal when a reference count of the target logical address is less than a threshold value, and generate a second signal when the reference count of the target logical address is equal to or more than the threshold value, a second search interface configured to receive map data whose respective reference counts are less than the threshold value in response to the first signal, a search memory configured to store map data whose respective reference counts are equal to or more than the threshold value, a first search buffer configured to store the map data received through the second search interface, and receive map data in response to the second signal; and a search engine configured to select map data by searching the map data.

11 Claims, 8 Drawing Sheets

ADDRESS SEARCH CIRCUIT AND METHOD OF SEMICONDUCTOR MEMORY APPARATUS AND CONTROLLER THEREFOR

CROSS-REFERENCE TO RELATED APPLICATION

The present application claims priority under 35 U.S.C. § 119(a) to Korean patent application number 10-2019-0109446, filed on Sep. 4, 2019, in the Korean Intellectual Property Office, which is incorporated herein by reference in its entirety.

BACKGROUND

1. Technical Field

Various embodiments generally relate to a semiconductor apparatus, and more particularly, to an address search circuit and method of a semiconductor apparatus and a controller therefor.

2. Related Art

Recently, the paradigm for the computing environment has transitioned to ubiquitous computing in which computer systems can be used anytime anywhere. Therefore, the use of portable electronic devices such as mobile phones, digital cameras and notebook computers has rapidly increased. Such potable electronic devices generally use a memory system using a memory device. The memory system is used to store data which are used in the portable electronic devices.

Since a memory system using a memory device has no mechanical driver, the memory system has excellent stability and durability, exhibits high information access speed, and has low power consumption. Examples of memory systems having such advantages include a USB (Universal Serial Bus) memory apparatus, a memory card having various interfaces, a UFS (Universal Flash Storage) device, and an SSD (Solid State Drive).

SUMMARY

In an embodiment, an address search circuit of a semiconductor memory apparatus may include: a first search interface configured to receive a search command including a target logical address and a reference count of the target logical address, generate a first signal including the target logical address when a reference count of the target logical address is less than a threshold value, and generate a second signal including the target logical address when the reference count of the target logical address is equal to or more than the threshold value; a second search interface configured to receive map data corresponding to the target logical address whose respective reference counts are less than the threshold value, among map data stored in an external device, from the external device in response to the first signal; a search memory configured to store map data whose respective reference counts are equal to or more than the threshold value, among the map data stored in the external device; a first search buffer configured to temporarily store the map data received through the second search interface in response to the first signal, and receive the map data from the search memory and temporarily store the received map data in response to the second signal; and a search engine configured to select map data including a physical address mapped to the target logical address by searching the map data temporarily stored in the first search buffer.

In an embodiment, a controller for controlling a semiconductor memory apparatus may include: a memory configured to store plural pieces of map data each including mapping information between a logical address and a physical address; a search engine configured to search target map data including a target physical address in response a search command; and a processor configured to generate the search command in response to a read command received from a host, and perform the read command based on the searched target physical address, wherein the search engine comprises: a first search interface configured to receive the search command including the target logical address and a reference count of the target logical address, generate a first signal including the target logical address when a reference count of the target logical address is less than a threshold value, and generate a second signal including the target logical address when the reference count of the target logical address is equal to or more than the threshold value; a second search interface configured to receive map data corresponding to the target logical address whose respective reference counts are less than the threshold value, among map data stored in the memory, from the memory in response to the first signal; a search memory configured to store map data whose respective reference counts are equal to or more than threshold value, among plural pieces of map data stored in the memory; a first search buffer configured to temporarily store the map data received through the second search interface in response to the first signal, and temporarily store the map data received from the search memory in response to the second signal; and a search engine configured to select the target map data by searching the map data temporarily stored in the first search buffer based on the target logical address.

In an embodiment, an address search method of a nonvolatile memory apparatus having a controller which includes a processor configured to generate a search command in response to a read command received from a host, a memory configured to store plural pieces of map data each including mapping information between a logical address and a physical address, and a search engine configured to search target map data in response to the search command, the address search method comprising: generating, by the search engine, a first signal when a reference count of the target logical address is less than a threshold value, and generating a second signal when the reference count of the target logical address is equal to or more than the threshold value, in response to the search command including a target logical address; receiving, by the search engine, map data corresponding to the target logical address whose respective reference counts are less than the threshold value, among the map data stored in the memory, from the memory and temporarily storing the received map data in a first search buffer, in response to the first signal; selecting, by the search engine, map data including a physical address mapped to the target logical address by searching the map data temporarily stored in the first search buffer in response to the first signal; and providing, by the search engine, the selected map data to the processor.

In an embodiment, an operating method of a controller for controlling a memory device, the operating method comprising: securing, in a first memory of the controller, first map data whose reference count is equal to or greater than a threshold among whole map data stored in a second memory of the controller; searching, in response to an access request provided along with a target logical address, second map data whose reference count is less than the threshold for map data corresponding to the target logical address when a reference count of the target logical address is less than the threshold; searching, in response to the access request, the first map data for the map data corresponding to the target logical address when the reference count is equal to or greater than the threshold; and controlling the memory device to perform an access operation based on a result of the searching.

DETAILED DESCRIPTION

Hereinafter, an address search circuit and method of a semiconductor apparatus and a controller therefor is described below with reference to the accompanying drawings through various embodiments.

Throughout the specification, reference to "an embodiment" or the like is not necessarily to only one embodiment, and different references to any such phrase are not necessarily to the same embodiment(s). Also, an open-ended transition term, such as "comprising," "including" or the like, when used herein, does not preclude the existence or addition of one or more elements or operations in addition to those stated. Similarly, use of an indefinite article, i.e., "a" or "an," is intended to mean one or more, unless the context clearly indicates that only one is intended.

Figure 1:
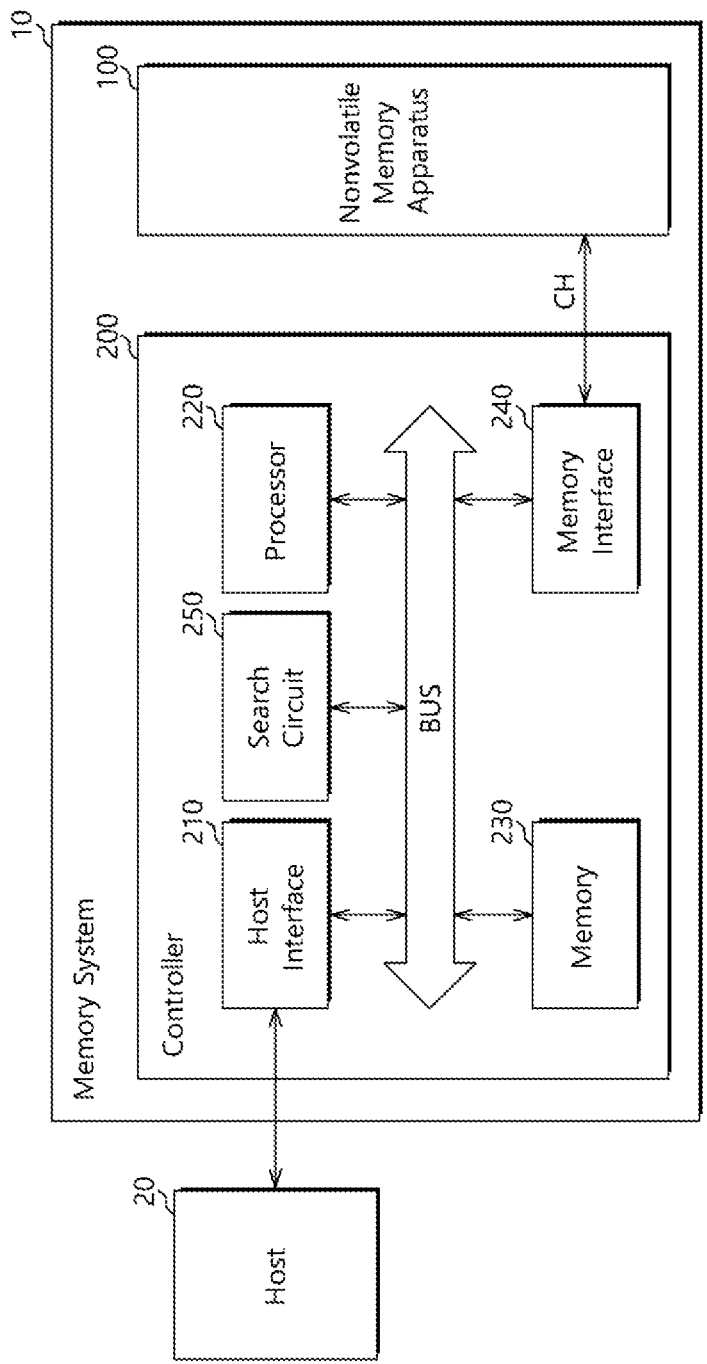
FIG. 1 is a diagram illustrating a configuration of a memory system in accordance with an embodiment of the present invention.

FIG. 1 is a diagram illustrating a configuration of a memory system 10 in accordance with an embodiment.

Referring to FIG. 1, the memory system 10 in accordance with is the present embodiment may store data accessed by a host 20 such as a mobile phone, MP3 player, laptop computer, desktop computer, game machine, TV or in-vehicle infotainment system.

The memory system 10 may be fabricated or configured as any of various types of storage devices, according to an interface protocol coupled to the host 20. For example, the memory system 10 may be configured as any of various types of storage devices which include an SSD (Solid State Drive), an MMC (Multi-Media Card) such as an eMMC, RS-MMC or micro-MMC, an SD (Secure Digital) card such as a mini-SD or micro-SD, a USB (Universal Storage Bus) storage device, a UFS (Universal Flash Storage) device, a PCMCIA (Personal Computer Memory Card International Association) card-type storage device, a PCI (Peripheral Component Interconnection) card-type storage device, a PCI-e (PCI Express) card-type storage device, a CF (Compact Flash) card, a smart media card and a memory stick.

The memory system 10 may be fabricated as any of various types of packages. For example, the memory system 10 may be fabricated as a POP (Package On Package), SIP (System In Package), SOC (System On Chip), MCP (Multi-Chip Package), COB (Chip-On-Board), WFP (Wafer-level Fabricated Package) and/or WSP (Wafer-level Stack Package).

The memory system 10 may include a nonvolatile memory apparatus 100 and a controller 200.

The nonvolatile memory apparatus 100 may operate as a storage medium of the memory system 10. The nonvolatile memory is apparatus 100 may be configured as any of various types of nonvolatile memory apparatuses such as a NAND flash memory, NOR flash memory, FRAM (Ferro-electric Random Access Memory) using ferroelectric capacitors, MRAM (Magnetic Random Access Memory) using TMR (Tunneling Magneto-Resistive) layers, PRAM (Phase Change Random Access Memory) using chalcogenide alloys, and/or ReRAM (Resistive Random Access Memory) using transition metal oxide, depending on the storage capacity of the individual memory cells.

FIG. 1 illustrates that the memory system 10 includes one nonvolatile memory apparatus 110, but this is only an example. The memory system 10 may include a plurality of nonvolatile memory apparatuses, and aspects and features of the present invention may be applied consistent with the teachings herein to the memory system 10 including the plurality of nonvolatile memory apparatuses.

The nonvolatile memory apparatus 100 may include a memory cell array (not illustrated) having a plurality of memory cells arranged at the respective intersections between a plurality of bit lines (not illustrated) and a plurality of word lines (not illustrated). The memory cell array may include a plurality of memory blocks, and each of the memory blocks may include a plurality of pages.

For example, each of the memory cells of the memory cell array may be an SLC (Single Level Cell) capable of storing 1 bit of data therein or an MLC (Multi-Level Cell) capable of storing 2 or bits of data therein. In general, an MLC may store 2 or more bits of data. However, in a more specific sense, the MLC may be reserved for a memory cell is for storing 2 bits of data, in which case a memory cell for storing 3 bits of data may be referred to as a TLC (Triple Level Cell), and a memory cell for storing 4 bits of data may be referred to as a QLC (Quad Level Cell). In the present embodiment, however, the term MLC may be used in its more general sense to denote memory cells for storing 2 or more bits of data.

The memory cell array may include one or more SLCs and/or MLCs. Furthermore, the memory cell array 110 may include memory cells with a 2D horizontal structure or memory cells with a 3D vertical structure.

The controller 200 may control overall operations of the memory system 10 by driving firmware or software loaded in the memory 230, which is external to the controller 200. The controller 200 may decode and drive a code-based instruction or algorithm such as firmware or software. The controller 200 may be implemented in hardware or a combination of hardware and software.

The controller 200 may include a host interface 210, a processor 220, a memory 230, a memory interface 240 and a search circuit 250. Although not illustrated in FIG. 1, the controller 200 may further include an ECC (Error Correction Code) engine which generates parity data by performing ECC encoding on write data provided from the host, and performs ECC decoding on read data read from the nonvolatile memory apparatus 100 using the parity data. Furthermore, the plurality of components included in the controller 200 may be coupled to one another through a bus (BUS). The bus may include a command channel (CMD_BUS) for transmitting a command and a data bus (DATA_BUS) for transmitting data.

The host interface 210 may interface the host 20 and the memory system 10 in response to a protocol of the host 20. For example, the host interface 210 may communicate with the host 20 through any of the following protocols: USB (Universal Serial Bus), UFS (Universal Flash Storage), MMC (Multi-Media Card), PATA (Parallel Advanced Technology Attachment), SATA (Serial Advanced Technology Attachment), SCSI (Small Computer System Interface), SAS (Serial Attached SCSI), PCI (Peripheral Component Interconnection) and PCI-e (PCI express).

The processor 220 may include a MCU (Micro Control Unit) and a CPU (Central Processing Unit). The processor 220 may process a request transferred from the host 20. In order to process the request transferred from the host 20, the processor 220 may drive a code-based instruction or algorithm, i.e. firmware, which is loaded in the memory 230, and control the nonvolatile memory apparatus 100 and internal function blocks such as the host interface 210, the memory 230 and the memory interface 240.

The processor 220 may generate control signals for controlling an operation of the nonvolatile memory apparatus 100, based on the requests transferred from the host 20, and provide the generated control signals to the nonvolatile memory apparatus 100 through the memory interface 240. In an embodiment, the processor 220 may configured to count a "reference count" of each logical address included in a request of the host. The reference count of a logical address indicates the number of times each of the logical address has been referenced.

The memory 230 may be configured as a RAM such as a dynamic RAM (DRAM) or static RAM (SRAM). The memory 230 may store the firmware driven by the processor 220. Furthermore, the memory 230 may store data required for driving the firmware, for example, metadata. That is, the memory 230 may operate as a working memory of the processor 220.

In an embodiment, the memory 230 may include a region in which program code for executing the function of an FTL (Flash Translation Layer) is stored, a region which is used as a command queue CMDQ for queuing a command corresponding to a request provided from the host 20, and regions for various other uses, such as a write data buffer for temporarily storing write data, a read data buffer for temporarily storing read data, and a map cache buffer for caching map data.

The memory interface 240 may control the nonvolatile memory apparatus 100 under control of the processor 220. The memory interface 240 may also be referred to as a memory controller. The memory interface 240 may provide control signals to the nonvolatile memory apparatus 100. The control signals may include a command, address and operation control signal for controlling the nonvolatile memory apparatus 100. The memory interface 240 may provide data stored in the data buffer to the nonvolatile memory is apparatus 100, or store data transferred from the nonvolatile memory apparatus 100 in the data buffer.

The search circuit 250 may search map data in response to a search command of the processor, the search command including a logical address. The memory 230 may store a map table including map data, and the search circuit 250 may search the map table of the memory 230 for map data including a physical address mapped to the logical address included in the search command. Detailed description of the search circuit 250 is given below with reference to FIGS. 2 to 4.

Figure 2:
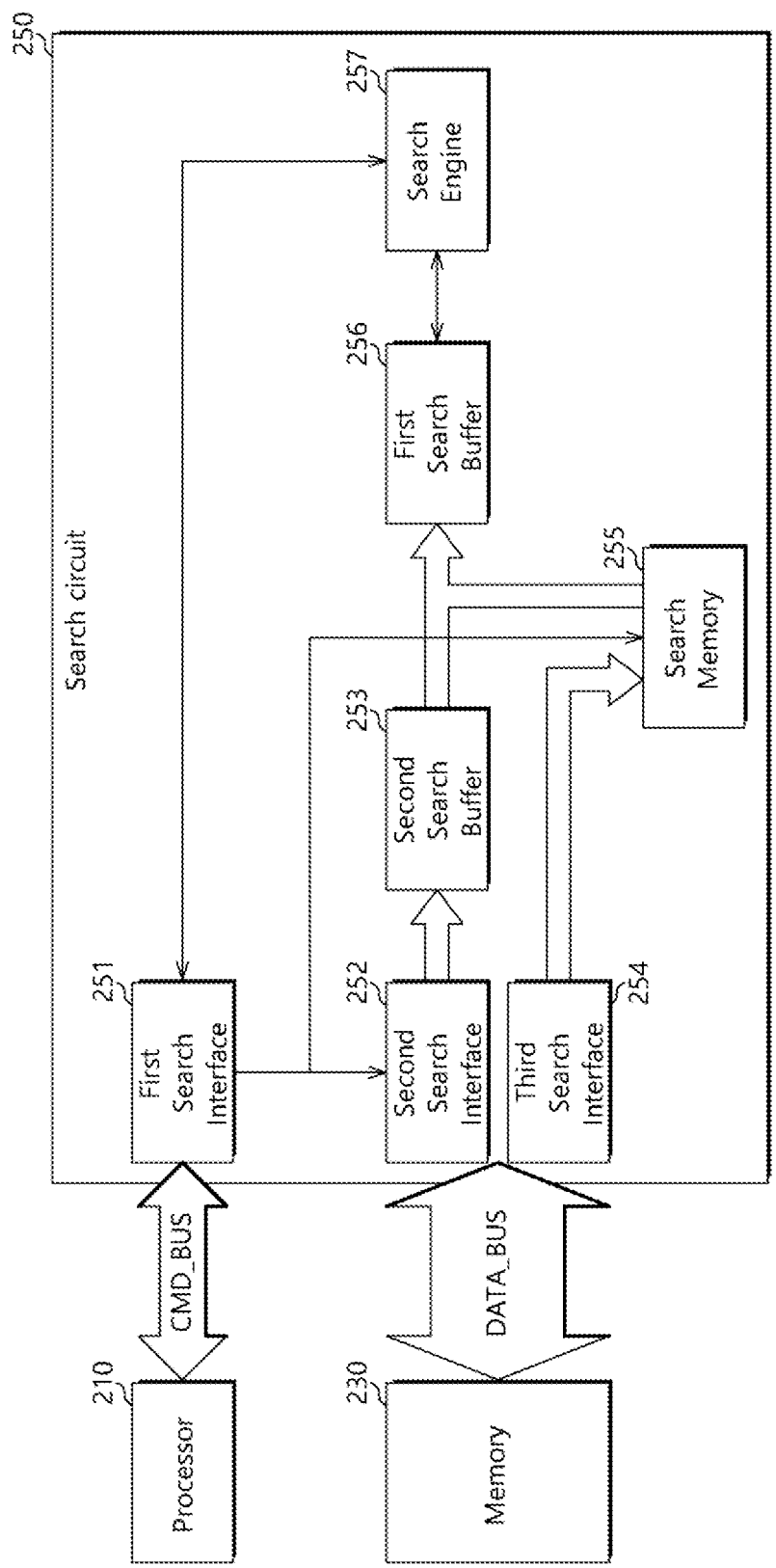
FIG. 2 is a block diagram illustrating an embodiment of a search circuit, such as that illustrated in FIG. 1.

FIG. 2 is a block diagram illustrating an embodiment of the search circuit illustrated in FIG. 1.

Referring to FIG. 2, the search circuit 250 may include a first search interface 251, a second search interface 252, a third search interface 254, a first search buffer 256, a second search buffer 253, a search engine 257 and a search memory 255.

The first search interface 251 may receive a search command including a reference count of a target logical address from the processor 220 through the command bus. The reference count of a target logical address indicates the number of times the target logical address has been referenced. The search command may include the target logical address which the controller 200 uses to service a read command received from the host 20. The first search interface 251 may store a threshold value, generate a first signal including the target logical address with a reference count is less than the threshold value when the reference count of the target logical address in the search command is less than the threshold value, and generate a second signal including the target logical address with a reference count is equal to or greater than the threshold value when the reference count of the target logical address is equal to or more than the threshold value. In an embodiment, the threshold value may be set in a fabrication or configuration phase of the memory system 10 in advance or may be set later during use of the memory system 10.

In an embodiment, the first signal may be a command for searching the memory 230 for target map data associated with the target logical address whose reference count is less than the threshold value. The first signal may be transferred to the second search interface 252, the first search buffer 256, the second search buffer 253 and the search engine 257.

In response to the first signal including the target logical address, the second search interface 252 may receive map data corresponding to the target logical address, the associated target logical address(es) of which each has a reference count that is less than the threshold value, among the map data stored in the memory 230.

In an embodiment, the second search interface 252 may include input/output ports, each having a bus width of L KB, where L is an integer equal to or more than 2. The bus width L KB may be equal to the data bus width of the controller 200.

The second search interface 252 may receive the map data stored in the memory 230 through the input/output ports, and transmit the received map data to the second search buffer 253.

The second search buffer 253 may temporarily store the map data transmitted from the second search interface 252, and transmit the stored map data to the first search buffer 256.

In an embodiment, the second search buffer 253 may receive the map data from the second search interface 252 through an input port whose bus width is L KB, where L is an integer equal to or more than 2. In an embodiment, the second search buffer 253 may include an output port whose bus width is M KB (=L*x, where x is an integer equal to or more than 2). After receiving x pieces of map data, each piece having a size of L KB, the second search buffer 253 may transmit the map data of M KB to the first search buffer 256.

For example, the second search buffer 253 may receive plural pieces (e.g., two or more pieces) of map data each having a size of L KB (e.g., 64 KB), and transmit the map data to the first search buffer 256 in units of 2 L KB (=128 KB) or 4 L KB (=256 KB) at the same time.

In an embodiment, the third search interface 254 may receive the map data from the memory 230 regardless of the first and second signals. For example, when the reference counts of the map data are updated or a set period arrives, the third search interface 254 may receive the map data and store the received map data in the search memory 255. The search memory 255 may be an internal memory of the search circuit 250.

In an embodiment, the third search interface 254 may include input/output ports each having a bus width of L KB, where L is an integer equal to or more than 2. The bus width L KB may be equal to the data bus width of the controller.

The search memory 255 may receive, from the third search interface 254, map data, the target logical address(es) of which have respective reference counts equal to or more than the threshold value and store the received map data therein. Then, the search memory 255 may transmit the stored map data to the first search buffer 256 in response to the second signal transmitted from the first search interface 251.

In an embodiment, the search memory 255 may include an input port whose bus width is L KB and an output port whose bus width is M KB (=L*x, where L and x are integers equal to or more than 2). For example, although the search memory 255 receives the map data in units of 64 KB (=L KB) from the third search interface 254, the search memory 255 may transmit the map data in units of 128 KB (=2 L KB), 256 KB (=4 L KB) or other suitable multiple of 64 KB to the first search buffer 256.

The first search buffer 256 may store the map data transmitted from the second search buffer 253 or the search memory 255.

In an embodiment, the first search buffer 256 may temporarily store the map data stored in the second search buffer 253 in response to the first signal provided from the first search interface 251. In an embodiment, the first search buffer 256 may receive the map data from the search memory 255 and temporarily store the received map data, in response to the second signal provided from the first search interface 251.

In an embodiment, the first search buffer 256 may include an input port whose bus width is M KB, where M is an integer larger than L. The input port of the first search buffer 256 may receive the map data from the second search buffer 253 in response to the first signal, and receive the map data from the search memory 255 in response to the second signal.

The search engine 257 may search the map data stored in the first search buffer 256, looking for the target map data. In an embodiment, the search engine 257 may search the map data stored in the first search buffer 256 for the target map data including the target logical address in the search command, and transmit a target physical address included in the target map data found in the search to the first search interface 251. Then, the first search interface 251 may transmit the target physical address to the processor 220 through the command bus.

Figure 3:
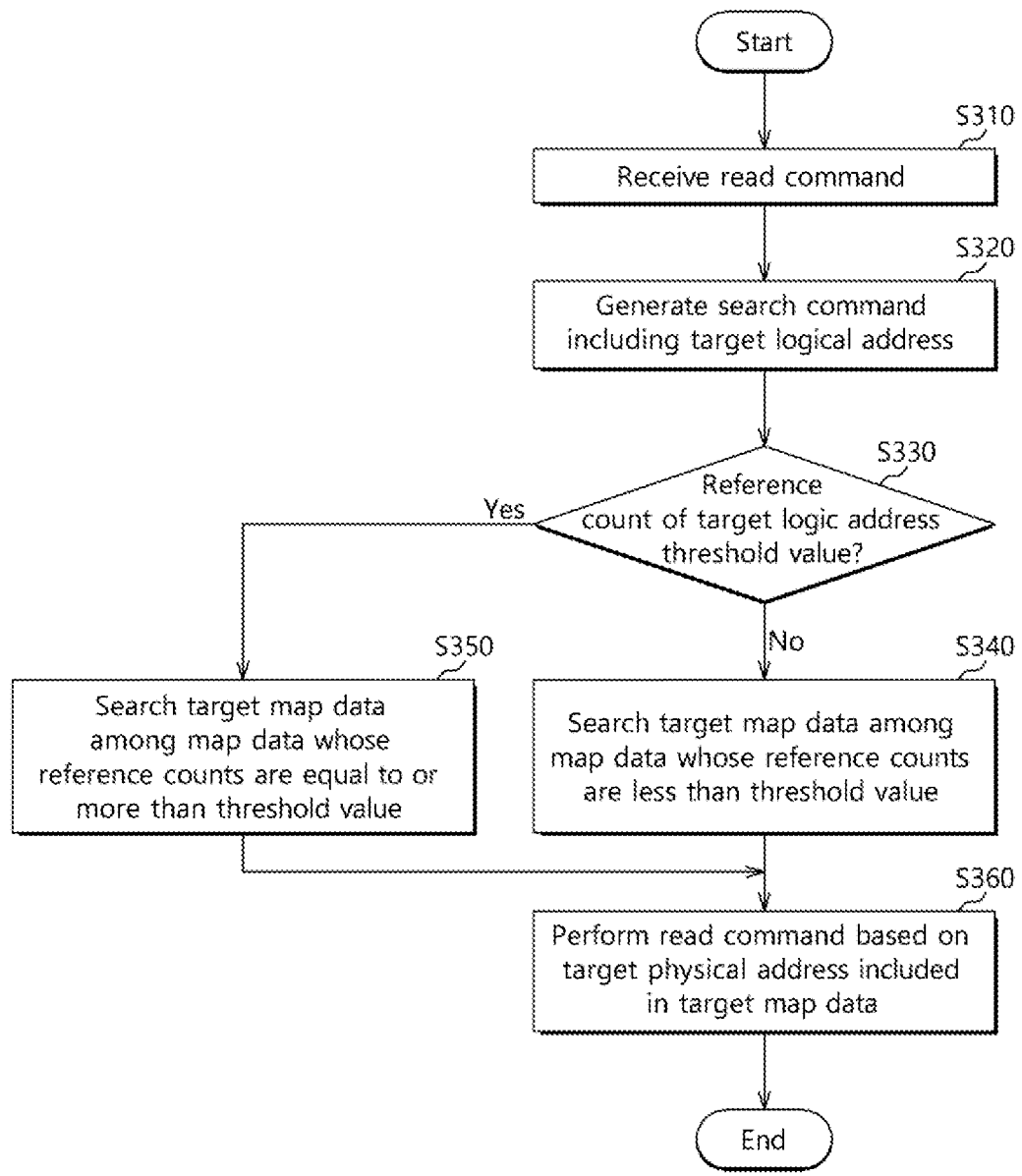
FIG. 3 is a flowchart describing an operation of a controller, such as that illustrated in FIG. 1.

FIG. 3 is a flowchart illustrating an operation of the controller illustrated in FIG. 1.

Referring to FIG. 3, when the controller 200 receives a read command from the host 20 in step S310, the controller 200 may generate a search command for searching for a target physical address mapped to a target logical address, based on the target logical address included in the read command, in step S320.

The controller 200 may compare the reference count of the target logical address with the threshold value, and determine whether is the reference count of the target logical address is equal to or more than the threshold value, in step S330.

When the determination result indicates that the reference count of the target logical address is less than the threshold value (No in step S330), the controller 200 may control the search circuit 250 to search for, and retrieve, pieces of map data whose respective reference counts are less than the threshold value, among the map data stored in the memory 230, in step S340.

When the determination result indicates that the reference count of the target logical address is equal to or more than the threshold value (Yes in step S330), the controller 200 may control the search circuit 250 to search for the target map data among the map data stored in the search memory 255 in step S350.

The controller 200 may process the read command based on the target physical address included in the target map data found in the search in step S340 or S350, in step S360.

Figure 4:
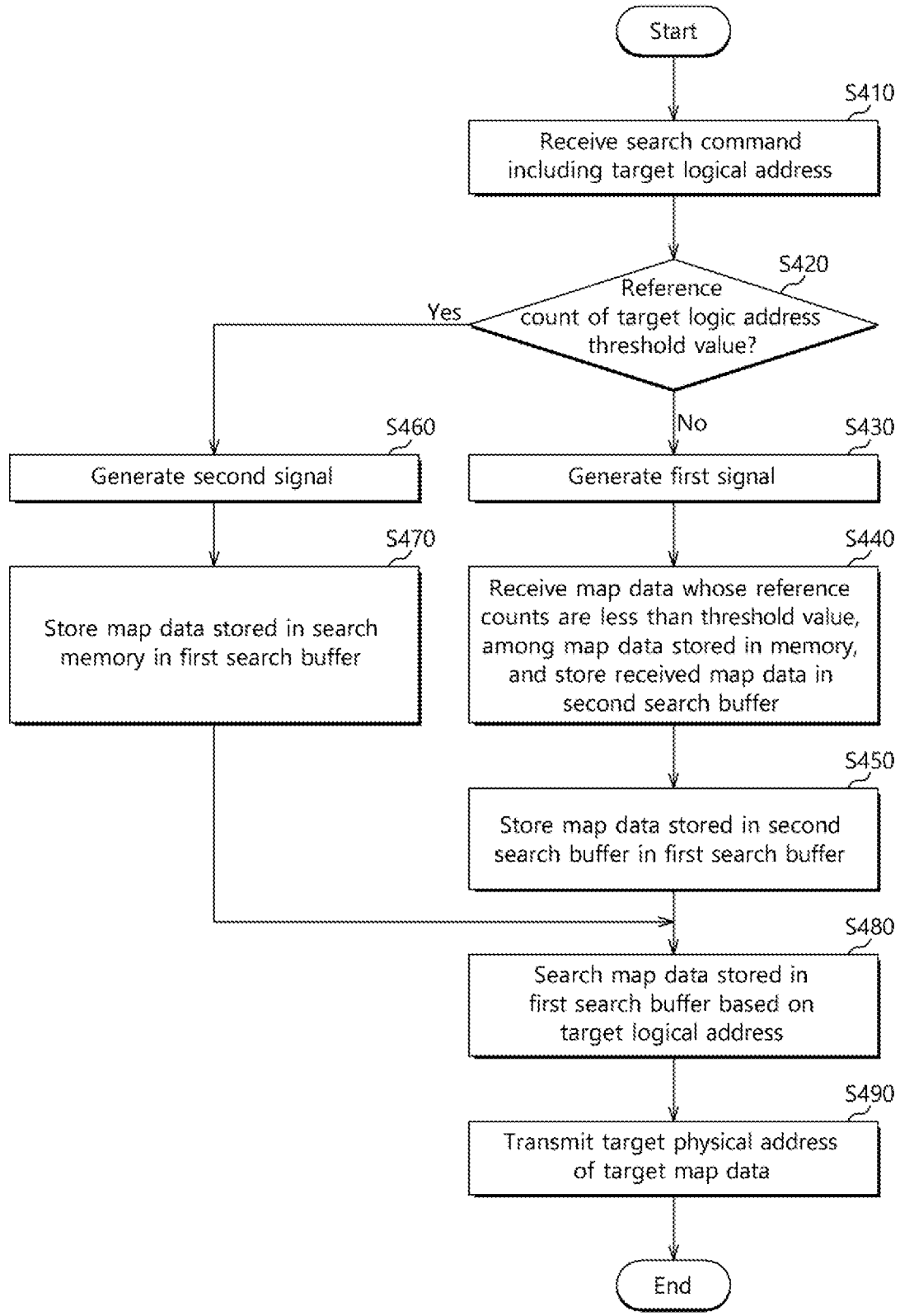
FIG. 4 is a flowchart describing an operation of a search circuit, such as that illustrated in FIG. 2.

FIG. 4 is a flowchart describing an operation of the search circuit 250 illustrated in FIG. 2.

In an embodiment, the processor 220 may configured to count a "reference count" of each logical address included in a request of the host.

Referring to FIG. 4, the first search interface 251 may receive a search command including a target logical address and a reference count of a target logical address from the processor 220 through the command bus in step S410.

The first search interface 251 may compare the reference count of the target logical address included in the search command with the threshold value, and determine whether the reference count of the target logical address is equal to or greater than the threshold value, in step S420.

When the determination result indicates that the reference count of the target logical address is less than the threshold value (No in step S420), the first search interface 251 may generate the first signal in step S430.

The second search interface 252 may receive pieces of map data whose respective reference counts are less than the threshold value, among the map data stored in the memory 230, through the data bus and store the received pieces of map data in the second search buffer 253, in response to the first signal, in step S440. In an embodiment, the second search buffer 253 may receive the pieces of map data from the second search interface 252 through the input port whose bus width is L KB.

The second search buffer 253 may transmit the received pieces of map data to the first search buffer 256 through the output terminal whose bus width is M KB, in step S450.

When the determination result indicates that the reference count of the target logical address is equal to or more than the threshold value (Yes in step S420), the first search interface 251 may generate the second signal in step S460.

The search memory 255 may transmit the map data within the is search memory 255 to the first search buffer 256 in response to the second signal in step S470.

The search engine 257 may search the map data stored in the first search buffer 256 for the target pieces of map data based on the target logical address, in step S480.

The search engine 257 may transmit a target physical address included in the target map data to the first search interface 251 in step S490.

Then, the first search interface 251 may transmit the target physical address, the target map data and the like to the processor 220 through the command bus, such that the read command is performed.

Figure 5:
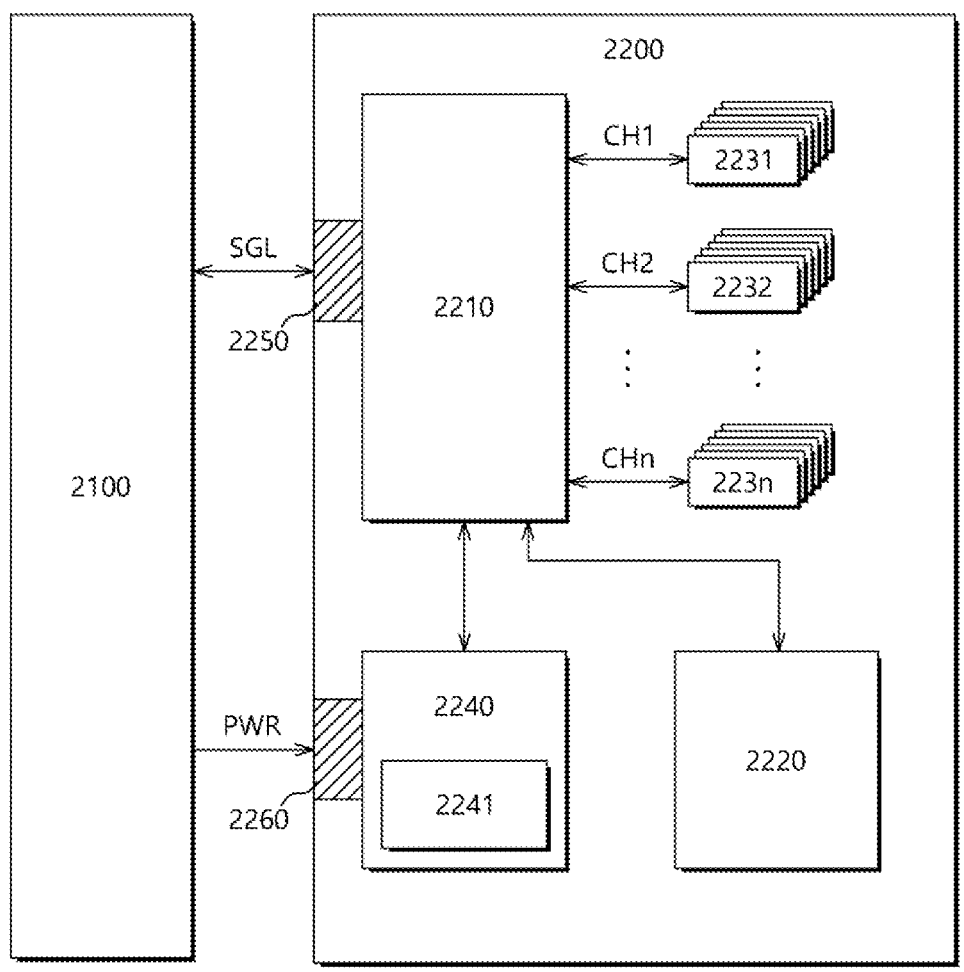
FIG. 5 is a diagram illustrating a data processing system including a solid-state drive (SSD) in accordance with an embodiment of the present invention.

FIG. 5 illustrates a data processing system including a solid state drive (SSD) in accordance with an embodiment. Referring to FIG. 5, a data processing system 2000 may include a host apparatus 2100 and a SSD 2200.

The SSD 2200 may include a controller 2210, a buffer memory device 2220, nonvolatile memory devices 2231 to 223n, a power supply 2240, a signal connector 2250, and a power connector 2260.

The controller 2210 may control overall operation of the SSD 2220.

The buffer memory device 2220 may temporarily store data to be stored in the nonvolatile memory devices 2231 to 223n. The buffer memory device 2220 may temporarily store data read from the nonvolatile memory devices 2231 to 223n. The data temporarily stored in the buffer memory device 2220 may be transmitted to the is host apparatus 2100 or the nonvolatile memory devices 2231 to 223n according to control of the controller 2210.

The nonvolatile memory devices 2231 to 223n may be used as a storage medium of the SSD 2200. The nonvolatile memory devices 2231 to 223n may be coupled to the controller 2210 through a plurality of channels CH1 to CHn. One or more nonvolatile memory devices may be coupled to one channel. The nonvolatile memory devices coupled to the same channel may be coupled to the same signal bus and the same data bus.

The power supply 2240 may provide power PWR input through the power connector 2260 to the inside of the SSD 2200. The power supply 2240 may include an auxiliary power supply 2241. The auxiliary power supply 2241 may supply the power so that the SSD 2200 is properly terminated even when sudden power-off occurs. The auxiliary power supply 2241 may include large capacity capacitors capable of charging the power PWR.

The controller 2210 may exchange a signal SGL with the host apparatus 2100 through the signal connector 2250. The signal SGL may include a command, an address, data, and the like. The signal connector 2250 may be configured as any of various types of connectors according to an interfacing method between the host apparatus 2100 and the SSD 2200.

Figure 6:
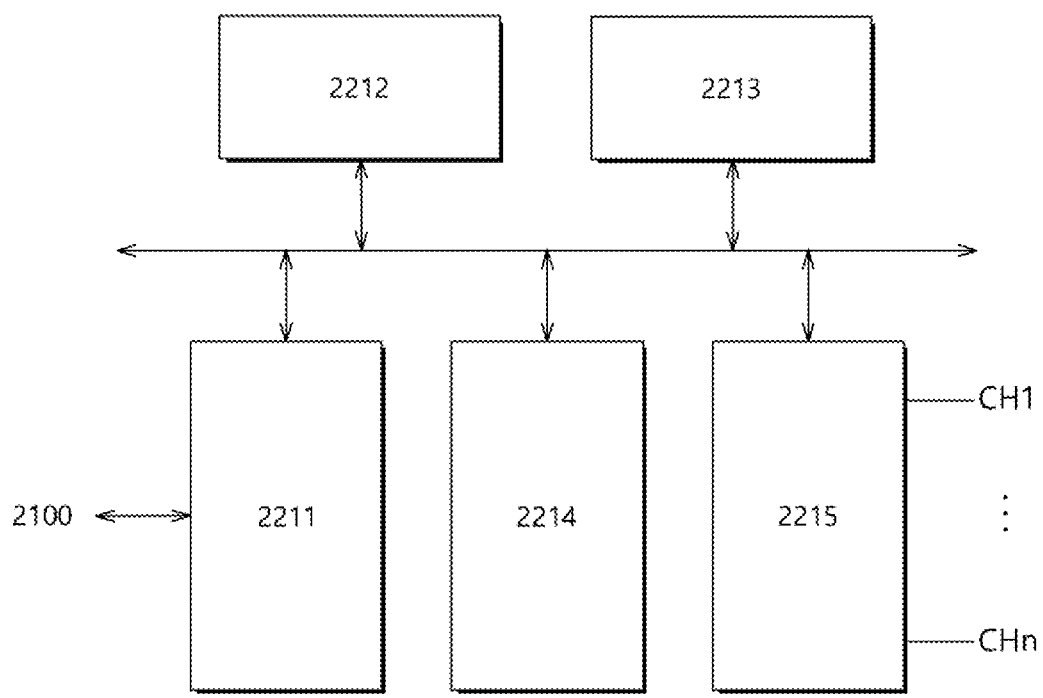
FIG. 6 is a diagram illustrating a controller, such as that illustrated in FIG. 5.

FIG. 6 illustrates the controller 2210 of FIG. 5. Referring to FIG. 6, the controller 2210 may include a host interface 2211, a control component 2212, a random access memory (RAM) 2213, an error is correction code (ECC) component 2214, and a memory interface 2215.

The host interface 2211 may perform interfacing between the host apparatus 2100 and the SSD 2200 according to a protocol of the host apparatus 2100. For example, the host interface 2211 may communicate with the host apparatus 2100 through any of a secure digital protocol, a universal serial bus (USB) protocol, a multimedia card (MMC) protocol, an embedded MMC (eMMC) protocol, a personal computer memory card international association (PCMCIA) protocol, a parallel advanced technology attachment (PATA) protocol, a serial advanced technology attachment (SATA) protocol, a small computer system interface (SCSI) protocol, a serial attached SCSI (SAS) protocol, a peripheral component interconnection (PCI) protocol, a PCI Express (PCI-E) protocol, and a universal flash storage (UFS) protocol. The host interface 2211 may perform a disc emulation function so that the host apparatus 2100 recognizes the SSD 2200 as a general-purpose data storage apparatus, for example, a hard disc drive HDD.

The control component 2212 may analyze and process the signal SGL input from the host apparatus 2100. The control component 2212 may control operations of internal functional blocks according to firmware and/or software for driving the SDD 2200. The RAM 2213 may be operated as a working memory for driving the firmware or software.

The ECC component 2214 may generate parity data for the data to be transferred to the nonvolatile memory devices 2231 to 223n. The generated parity data may be stored in the nonvolatile memory devices 2231 to 223n together with the data. The ECC component 2214 may detect errors for data read from the nonvolatile memory devices 2231 to 223n based on the parity data. When detected errors are within a correctable range, the ECC component 2214 may correct the detected errors.

The memory interface 2215 may provide a control signal such as a command and an address to the nonvolatile memory devices 2231 to 223n according to control of the control component 2212. The memory interface 2215 may exchange data with the nonvolatile memory devices 2231 to 223n according to control of the control component 2212. For example, the memory interface 2215 may provide data stored in the buffer memory device 2220 to the nonvolatile memory devices 2231 to 223n or provide data read from the nonvolatile memory devices 2231 to 223n to the buffer memory device 2220.

Figure 7:
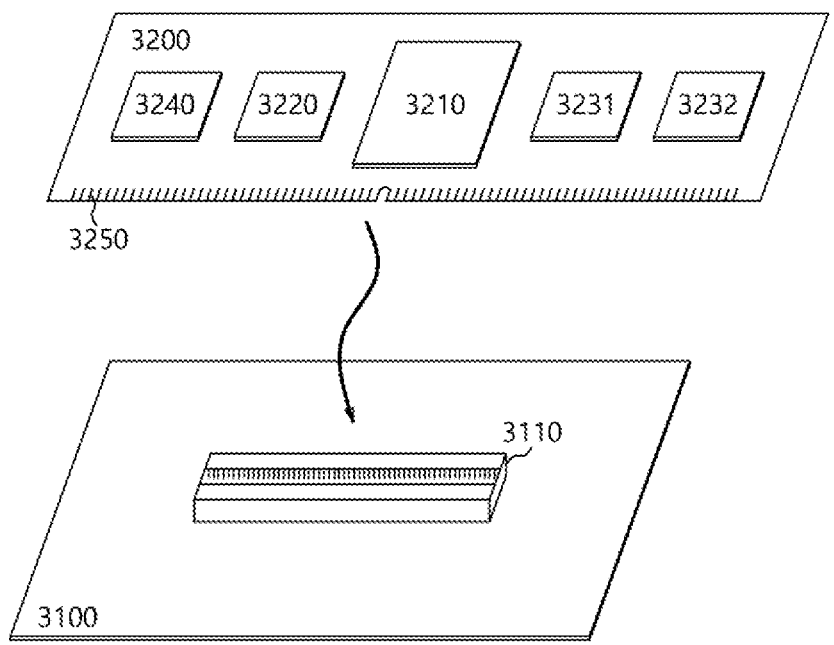
FIG. 7 is a diagram illustrating a data processing system including a data storage apparatus in accordance with an embodiment of the present invention.

FIG. 7 illustrates a data processing system including a data storage apparatus in accordance with an embodiment. Referring to FIG. 7, a data processing system 3000 may include a host apparatus 3100 and a data storage apparatus 3200.

The host apparatus 3100 may be configured in a board form such as a printed circuit board (PCB). Although not shown in FIG. 7, the host apparatus 3100 may include internal functional blocks configured to perform functions of the host apparatus 3100.

The host apparatus 3100 may include a connection terminal 3110 such as a socket, a slot, or a connector. The data storage apparatus 3200 may be mounted on the connection terminal 3110.

The data storage apparatus 3200 may be configured in a board form such as a PCB. The data storage apparatus 3200 may refer to a memory module or a memory card. The data storage apparatus 3200 may include a controller 3210, a buffer memory device 3220, nonvolatile memory devices 3231 to 3232, a power management integrated circuit (PMIC) 3240, and a connection terminal 3250.

The controller 3210 may control overall operation of the data storage apparatus 3200. The controller 3210 may be configured the same as the controller 2210 illustrated in FIG. 6.

The buffer memory device 3220 may temporarily store data to be stored in the nonvolatile memory devices 3231, and 3232. The buffer memory device 3220 may temporarily store data read from the nonvolatile memory devices 3231, and 3232. The data temporarily stored in the buffer memory device 3220 may be transmitted to the host apparatus 3100 or the nonvolatile memory devices 3231, and 3232 according to control of the controller 3210.

The nonvolatile memory devices 3231, and 3232 may be used as a storage medium of the data storage apparatus 3200.

The PMIC 3240 may provide power input through the connection terminal 3250 to the inside of the data storage apparatus 3200. The PMIC 3240 may manage the power of the data storage apparatus 3200 according to control of the controller 3210.

The connection terminal 3250 may be coupled to the connection terminal 3110 of the host apparatus 3100. A signal such as a command, an address, and data, and power may be transmitted between the host apparatus 3100 and the data storage apparatus 3200 through the connection terminal 3250. The connection terminal 3250 may be configured in any of various forms according to an interfacing method between the host apparatus 3100 and the data storage apparatus 3200. The connection terminal 3250 may be arranged in any side of the data storage apparatus 3200.

Figure 8:
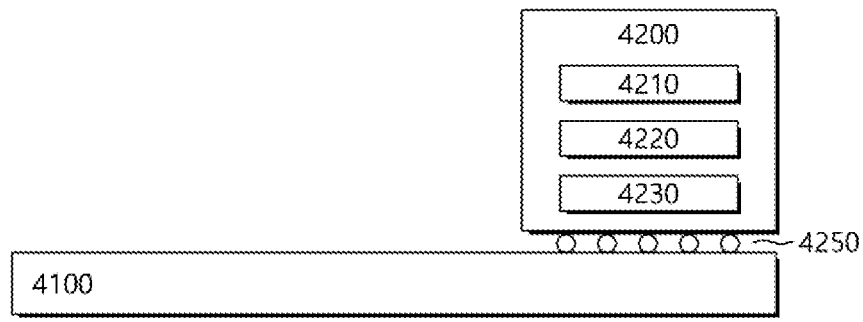
FIG. 8 is a diagram illustrating a data processing system including a data storage apparatus in accordance with an embodiment of the present invention.

FIG. 8 illustrates a data processing system including a data storage apparatus in accordance with an embodiment. Referring to FIG. 8, a data processing system 4000 may include a host apparatus 4100 and a data storage apparatus 4200.

The host apparatus 4100 may be configured in a board form such as a printed circuit board (PCB). Although not shown in FIG. 8, the host apparatus 4100 may include internal functional blocks configured to perform functions of the host apparatus 4100.

The data storage apparatus 4200 may be configured in a surface mounting packaging form. The data storage apparatus 4200 may be mounted on the host apparatus 4100 through a solder ball 4250. The data storage apparatus 4200 may include a controller 4210, a buffer memory device 4220, and a nonvolatile memory device 4230.

The controller 4210 may control overall operation of the data storage apparatus 4200. The controller 4210 may be configured the same as the controller 2210 illustrated in FIG. 6.

The buffer memory device 4220 may temporarily store data to be stored in the nonvolatile memory device 4230. The buffer memory device 4220 may temporarily store data read from the nonvolatile memory device 4230. The data temporarily stored in the buffer memory device 4220 may be transmitted to the host apparatus 4100 or the nonvolatile memory device 4230 through control of the controller 4210.

The nonvolatile memory device 4230 may be used as a storage medium of the data storage apparatus 4200.

Figure 9:
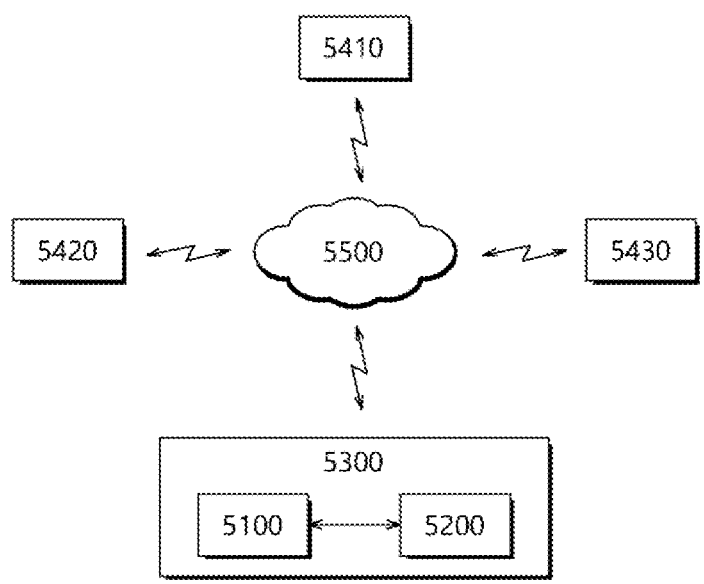
FIG. 9 is a diagram illustrating a network system including a data storage apparatus in accordance with an embodiment of the present invention.

FIG. 9 illustrates a network system 5000 including a data storage apparatus in accordance with an embodiment. Referring to FIG. 9, the network system 5000 may include a server system 5300 and a plurality of client systems 5410 to 5430 which are coupled through a network 5500.

The server system 5300 may serve data in response to requests of the plurality of client systems 5410 to 5430. For example, the server system 5300 may store data provided from the plurality of client systems 5410 to 5430. In another example, the server system 5300 may provide data to the plurality of client systems 5410 to 5430.

The server system 5300 may include a host apparatus 5100 and a data storage apparatus 5200. The data storage apparatus 5200 may be configured of the data storage device 10 of FIG. 1, the SSD 2200 of FIG. 5, the data storage apparatus 3200 of FIG. 7, or the data storage apparatus 4200 of FIG. 8.

Figure 10:
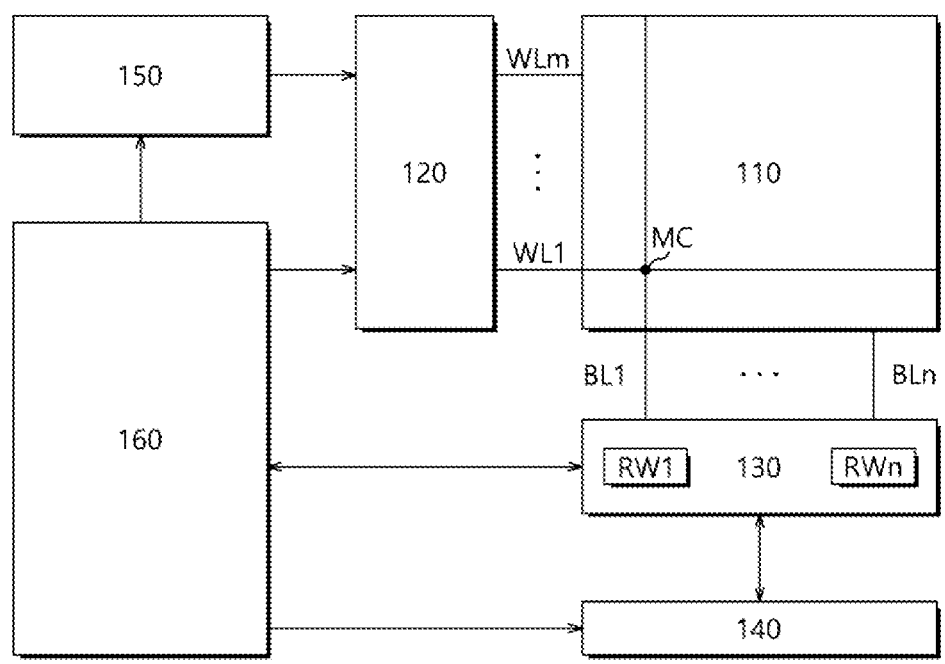
FIG. 10 is a diagram illustrating a nonvolatile memory device included in a data storage apparatus in accordance with an embodiment of the present invention.

FIG. 10 illustrates a nonvolatile memory device included in a data storage apparatus in accordance with an embodiment. Referring to FIG. 10, a nonvolatile memory device 100 may include a memory cell array 110, a row decoder 120, a column decoder 140, a data read/write block 130, a voltage generator 150, and control logic 160.

The memory cell array 110 may include memory cells MC arranged in regions at which word lines WL1 to WLm and bit lines BL1 to BLn intersect.

The row decoder 120 may be coupled to the memory cell array 110 through the word lines WL1 to WLm. The row decoder 120 may operate through control of the control logic 160. The row decoder 120 may decode an address provided from an external apparatus (not shown). The row decoder 120 may select and drive the word lines WL1 to WLm based on a decoding result. For example, the row decoder 120 may provide a word line voltage provided from the voltage generator 150 to the word lines WL1 to WLm.

The data read/write block 130 may be coupled to the memory cell array 110 through the bit lines BL1 to BLn. The data read/write block 130 may include read/write circuits RW1 to RWn corresponding to the bit lines BL1 to BLn. The data read/write block 130 may operate according to control of the control logic 160. The data read/write block 130 may operate as a write driver or a sense amplifier according to an operation mode. For example, the data read/write block 130 may operate as the write driver configured to store data provided from an external apparatus in the memory cell array 110 in a write operation. In another example, the data read/write block 130 may operate as the sense amplifier configured to read data from the memory cell array 110 in a read operation.

The column decoder 140 may operate through control of the control logic 160. The column decoder 140 may decode an address provided from an external apparatus (not shown). The column decoder 140 may couple the read/write circuits RW1 to RWn of the data read/write block 130 corresponding to the bit lines BL1 to BLn and data input/output (I/O) lines (or data I/O buffers) based on a decoding result.

The voltage generator 150 may generate voltages used for an internal operation of the nonvolatile memory device 100. The voltages generated through the voltage generator 150 may be applied to the memory cells of the memory cell array 110. For example, a program voltage generated in a program operation may be applied to word lines of memory cells in which the program operation is to be performed. In another example, an erase voltage generated in an erase operation may be applied to well regions of memory cells in which the erase operation is to be performed. In another example, a read voltage generated in a read operation may be applied to word lines of memory cells in which the read operation is to be performed.

The control logic 160 may control overall operation of the nonvolatile memory device 100 based on a control signal provided from an external apparatus. For example, the control logic 160 may control an operation of the nonvolatile memory device 100 such as a read operation, a write operation, and an erase operation of the nonvolatile memory device 100.

While various embodiments have been illustrated and described above, it will be understood by those skilled in the art in light of the present disclosure that the disclosed embodiments are examples only. Accordingly, the present invention is not limited to or by any of the disclosed embodiments. Rather, the present invention encompasses all modifications and variations of any of the disclosed embodiments to the extent such modifications and variations fall within the scope of the claims.

What is claimed is:

1. An address search circuit of a semiconductor memory apparatus, comprising:
   a first search interface configured to receive a search command including a target logical address and a reference count of the target logical address, generate a first signal including the target logical address when a reference count of the target logical address is less than a threshold value, and generate a second signal including the target logical address when the reference count of the target logical address is equal to or more than the threshold value;
   a second search interface configured to receive first map data corresponding to the target logical address whose respective reference counts are less than the threshold value, among map data stored in an external device, from the external device in response to the first signal, and transmit the first map data to a second search buffer;
   a search memory configured to store second map data whose respective reference counts are equal to or more than the threshold value, among the map data stored in the external device;
   a first search buffer configured to temporarily store the first map data received through the second search buffer in response to the first signal, and temporarily store the second map data received through the search memory in response to the second signal; and
   a search engine configured to select map data including a physical address mapped to the target logical address by searching the first or the second map data temporarily stored in the first search buffer,
   wherein each map data includes mapping information between a logical address and a physical address, and
   wherein the external device is configured to include a map cache buffer for caching map data received from another external device.

2. The address search circuit according to claim 1,
   wherein the second search interface comprises input/output ports configured to receive the first map data from the external device and transmit the first map data to the second search buffer, and each having a bus width of L KB, where L is an integer equal to or more than 2, and
   wherein the second search buffer comprises an input port configured to receive the first map data from the second search interface and having a bus width of L KB and an output port configured to transmit the first map data to the first search buffer and having a bus width of M KB, where M is an integer larger than L.

3. The address search circuit according to claim 1, further comprising a third search interface configured to receive the second map from the external device, and transmit the second map data to the search memory.

4. The address search circuit according to claim 3,
   wherein the third search interface comprises input/output ports configured to receive the second map data from the external device and transmit the second map data to the search memory, and each having a bus width of L KB, where L is an integer equal to or more than 2, and
   wherein the search memory comprises an input port configured to receive the second map data from the third search interface and having a bus width of L KB and an output port configured to transmit the second map data to the first search buffer and having a bus width of M KB, where M is an integer larger than L.

5. A controller for controlling a semiconductor memory apparatus, comprising:
   a memory configured to store plural pieces of map data each including mapping information between a logical address and a physical address, received from an external device;
   a search circuit configured to search target map data including a target physical address in response to a search command; and
   a processor configured to generate the search command in response to a read command received from a host, and perform the read command based on the searched target physical address,
   wherein the search circuit comprises:
   a first search interface configured to receive the search command including the target logical address and a reference count of the target logical address, generate a first signal including the target logical address when a reference count of the target logical address is less than a threshold value, and generate a second signal including the target logical address when the reference count of the target logical address is equal to or more than the threshold value;
   a second search interface configured to receive first map data corresponding to the target logical address whose respective reference counts are less than the threshold value, among the map data stored in the memory, from the memory in response to the first signal, and transmit the first map data to a second search buffer;
   a search memory configured to store second map data whose respective reference counts are equal to or more than threshold value, among plural pieces of map data stored in the memory;
   a first search buffer configured to temporarily store the first map data received through the second search buffer in response to the first signal, and temporarily store the second map data received from the search memory in response to the second signal; and
   a search engine configured to select the target map data by searching the first or the second map data temporarily stored in the first search buffer based on the target logical address.

6. The controller according to claim 5,
   wherein the second search interface comprises input/output ports configured to receive the first map data from the memory and transmit the first map data to the second search buffer, and each having a bus width of L KB, where L is an integer equal to or more than 2, and
   wherein the second search buffer comprises an input port configured to receive the first map data from the second search interface and having a bus width of L KB and an output port configured to transmit the first map data to the first search buffer and having a bus width of M KB, where M is an integer larger than L.

7. The controller according to claim 5, further comprising a third search interface configured to receive the second map data whose respective reference counts are equal to or more than the threshold value from the memory, and transmit the second map data to the search memory.

8. The controller according to claim 7,
   wherein the third search interface comprises input/output ports configured to receive the map data from the memory and transmit the second map data to the search memory, and each having a bus width of L KB, where L is an integer equal to or more than 2, and
   wherein the search memory comprises an input port configured to receive the map data from the third search interface and having a bus width of L KB and an output port configured to transmit the second map data to the first search buffer and having a bus width of M KB, where M is an integer larger than L.

9. An address search method of a nonvolatile memory apparatus having a controller which includes a processor configured to generate a search command in response to a read command received from a host, a memory configured to store plural pieces of map data each including mapping information between a logical address and a physical address, and a search circuit configured to search target map data in response to the search command, the address search method comprising:

caching, by the memory, the plural pieces of map data received from an external device;

generating, by the search circuit, a first signal when a reference count of the target logical address is less than a threshold value, and generating a second signal when the reference count of the target logical address is equal to or more than the threshold value, in response to the search command including a target logical address;

receiving, by the search circuit, first map data corresponding to the target logical address whose respective reference counts are less than the threshold value, among the map data stored in the memory, from the memory and temporarily storing the first map data in a second search buffer, in response to the first signal;

transmitting, by the search circuit, a set number of first map data stored in the second search buffer to a first search buffer at the same time, in response to the first signal;

selecting, by the search circuit, map data including a physical address mapped to the target logical address by searching the map data temporarily stored in the first search buffer in response to the first signal; and providing, by the search circuit, the selected map data to the processor.

10. The address search method of claim 9, further comprising:

receiving, by the search circuit, second map data whose respective reference counts are equal to or more than the threshold value, among the map data stored in the memory, and storing the second map data in a search memory;

transmitting, by the search circuit, the second map data stored in the search memory to the first search buffer, in response to the second signal;

selecting, by the search circuit, map data including a physical address mapped to the target logical address by searching the second map data temporarily stored in the first search buffer in response to the second signal; and providing, by the search circuit, the selected map data to the processor.

11. An operating method of a controller for controlling a memory device, the operating method comprising:

caching, by a map cache buffer of the controller, the plural pieces of map data each including mapping information between a logical address and a physical address, received from an external device;

securing, in a first memory of the controller, first map data whose reference count is equal to or greater than a threshold among whole map data stored in the map cache buffer;

securing, in a second memory of the controller, second map data whose reference count is less than the threshold among whole map data stored in the map cache buffer;

selectively storing, in a third memory of the controller, the first map data or the second map data based on an access request provided along with a target logical address;

searching, in response to the access request provided along with the target logical address, the second map data whose reference count is less than the threshold for map data corresponding to the target logical address when a reference count of the target logical address is less than the threshold;

searching, in response to the access request, the first map data for the map data corresponding to the target logical address when the reference count is equal to or greater than the threshold; and controlling the memory device to perform an access operation based on a result of the searching.

\* \* \* \* \*